US011245267B2

(12) United States Patent
Chang (10) Patent No.: US 11,245,267 B2
(45) Date of Patent: Feb. 8, 2022

(54) BATTERY SYSTEM, BATTERY MODULE AND BATTERY CONTROL CIRCUIT THEREOF

(71) Applicant: Richtek Technology Corporation, Zhubei (TW)

(72) Inventor: Wei-Hsu Chang, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 32 days.

(21) Appl. No.: 16/850,893

(22) Filed: Apr. 16, 2020

(65) Prior Publication Data

US 2021/0075227 A1 Mar. 11, 2021

(30) Foreign Application Priority Data

Sep. 10, 2019 (TW) .................................. 108132658

(51) Int. Cl.
*H02J 7/00* (2006.01)
*H01M 10/42* (2006.01)
*H01M 10/48* (2006.01)

(52) U.S. Cl.
CPC ......... *H02J 7/0014* (2013.01); *H01M 10/425* (2013.01); *H01M 10/482* (2013.01); *H02J 7/00032* (2020.01); *H02J 7/0047* (2013.01); *H01M 2010/4271* (2013.01); *H01M 2010/4278* (2013.01); *H02J 7/00308* (2020.01)

(58) Field of Classification Search
CPC .... H02J 7/0014; H02J 7/00032; H02J 7/0047; H02J 7/00308; H01M 2010/4271; H01M 10/482; H01M 2010/4278; H01M 10/425
USPC ......................................................... 320/116
See application file for complete search history.

(56) References Cited

U.S. PATENT DOCUMENTS

| 8,010,724 | B2 | 8/2011 | Wortham et al. |
| 8,346,977 | B2 * | 1/2013 | Zeng et al. ......... G06F 13/4282 |
| | | | 710/4 |
| 10,741,888 | B2 * | 8/2020 | Martin et al. ............. H02J 7/34 |
| 2011/0289239 | A1 | 11/2011 | Zeng et al. |
| 2019/0006723 | A1 | 1/2019 | Martin et al. |

* cited by examiner

*Primary Examiner* — Sun J Lin
(74) *Attorney, Agent, or Firm* — Tung & Associates (57) ABSTRACT

A battery module for use in a battery system is coupled with other battery modules in the battery system in a daisy-chain configuration. And, the battery module communicates with the other battery modules through a daisy chain according to a communication interface protocol which has a predetermined number of clock pulses. The battery module includes a battery unit and a battery control circuit. When the battery module operates in a bottom mode, the battery control circuit generates an upstream clock output signal which includes the predetermined number of clock pulses plus a number of inserted clock pulses, to compensate a clock difference caused by a propagation delay of the daisy chain, such that the battery module is able to synchronously receive a downstream data signal transmitted from a target module via the daisy chain as the battery module is transmitting an upstream clock output signal.

29 Claims, 6 Drawing Sheets

BATTERY SYSTEM, BATTERY MODULE AND BATTERY CONTROL CIRCUIT THEREOF

CROSS REFERENCE

The present invention claims priority to TW 108132658, filed on Sep. 10, 2019.

BACKGROUND OF THE INVENTION

Field of Invention

The present invention relates to a battery system; particularly, it relates to such battery system having a daisy chain. The present invention also relates to battery modules and battery control circuits for use in such battery system.

Description of Related Art

The relevant prior art of which the inventor is aware includes the specification of LTC6804 Multi-cell Monitors, and the following U.S. patents or U.S. patent publications: U.S. Pat. No. 8,010,724 "I2C/SMBUS Ladders and Laddered Enabled ICs"; U.S. patent publication No. 2011/0289239 A1 "Device Address Assignment in a Bus Cascade System"; and U.S. patent publication No. 2019/0006723 A1 "Multi-Channel and Bi-directional Battery management System".

A high-power battery system (such as for use in an electric vehicle) includes a large number of battery modules. In the battery system, the battery modules are typically connected in series to enhance the output voltage of the battery system so as to reduce the current level and the wire diameter of the power cord. Typically, under such configuration, each battery module will include a certain amount of batteries which are connected to one another in series.

Figure 1:
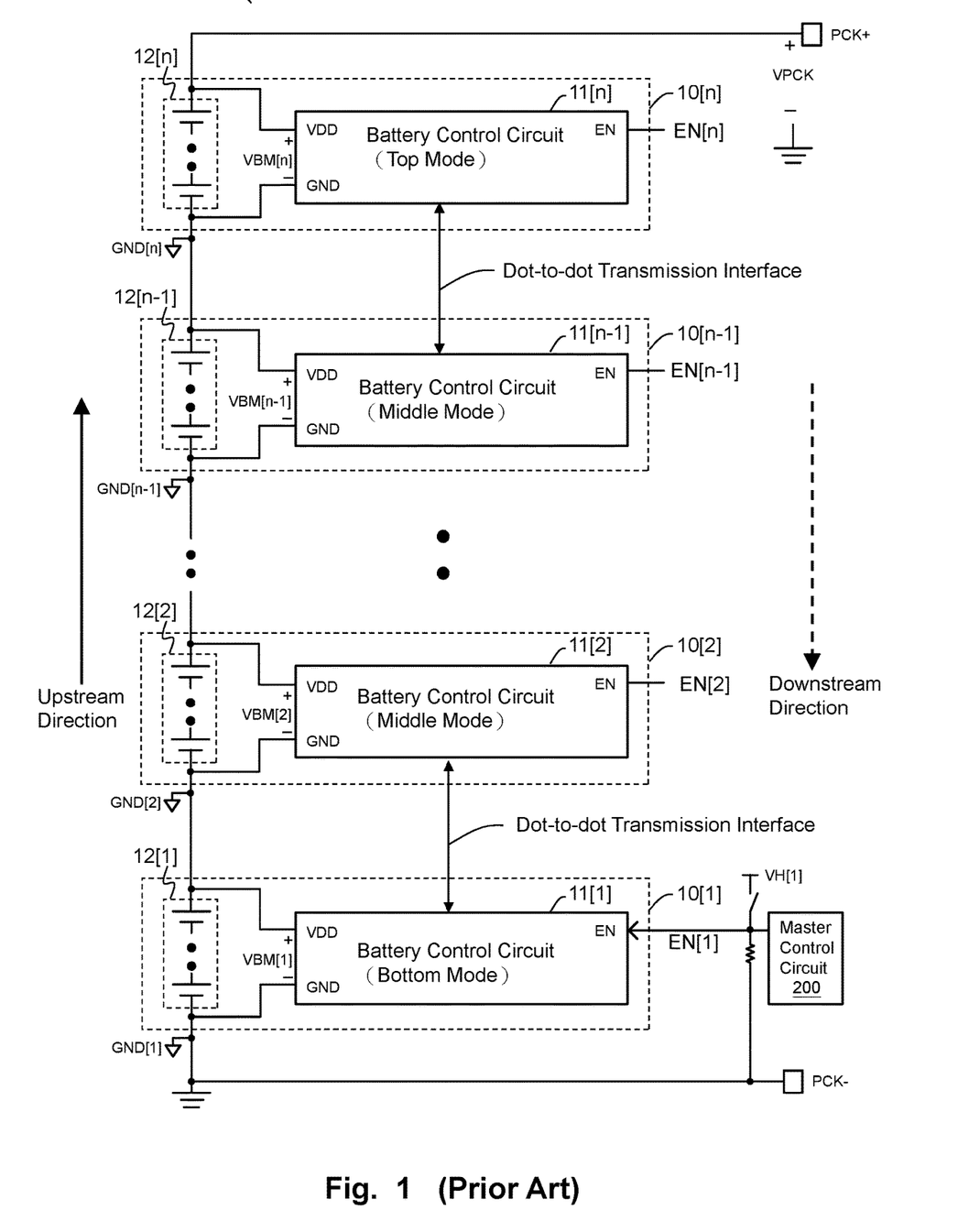
FIG. 1 shows a schematic block diagram of a prior art battery system having a daisy chain topology.

FIG. 1 shows a prior art battery system which has a daisy chain topology (battery system 1). The battery system 1 includes battery modules 10[1]~10[n] which are coupled to forma daisy chain. The battery modules 10[1]~10[n] include corresponding battery units (battery units 12[1]~12[n]) and corresponding battery control circuits (battery control circuits 11[1]~11[n]). Each battery control circuit is configured to operably control its corresponding battery unit, such as to perform over voltage protection in charging operation or to perform under voltage protection in discharging operation. In a configuration wherein the battery unit includes plural batteries, the corresponding battery control circuit performs a voltage balancing control among the batteries of the battery unit. Besides, the battery control circuits provide a communication function among the battery modules which are coupled to form the daisy chain. In the configuration of the daisy chain, the battery modules can operate in different identification modes. For example, one can operate in the top mode (e.g. battery module 10[n] in FIG. 1), the middle mode (e.g. battery modules 10[2]~10[n-1] in FIG. 1) or the bottom mode (e.g. battery module 10[1] in FIG. 1).

The prior art in FIG. 1 has a drawback that: because the battery modules are connected to one another by daisy chain configuration, data communication among respective battery modules are performed via dot-to-dot transmission. This leads to complicated design for the battery modules and more power consumption.

As compared to the prior art in FIG. 1, the present invention is advantageous in that: the present invention can perform synchronous data communication via a master-slave type serial communication protocol (for example but not limited to Inter-Integrated Circuit (I2C Bus) protocol). Consequently and desirably, the present invention is more cost-effective and has lower power consumption.

SUMMARY OF THE INVENTION

From one perspective, the present invention provides a first battery module for use in a battery system to be coupled to other second battery modules in the battery system in daisy-chain configuration, wherein the first battery module communicates with other second battery modules through a daisy chain according to a communication interface protocol, wherein the communication interface protocol performs data communication via a data packet, wherein the data packet has a predetermined number of clock pulses for performing synchronous data communication, wherein a target module is determined to be the first battery module or one of the second battery modules according to address information, wherein in the daisy chain, the first battery module operates in a bottom mode, a middle mode or a top mode; the first battery module comprising: a battery unit including at least one battery, wherein the battery unit outputs a battery unit voltage between a positive terminal and a negative terminal of the battery unit; and a battery control circuit, which is powered by the battery unit voltage, the battery control circuit being configured to operably detect the battery unit voltage of the battery unit and/or control the battery unit, wherein the battery control circuit includes an upstream clock output terminal; wherein when the first battery module operates in the bottom mode, the battery control circuit generates an upstream clock output signal complying with the communication interface protocol at the upstream clock output terminal, wherein the upstream clock output signal includes the predetermined number of clock pulses plus a number of inserted clock pulses, wherein the number of inserted clock pulses is greater than or equal to one, to compensate a clock difference caused by the daisy chain, such that the first battery module is able to synchronously receive a downstream data signal transmitted from the target module via the daisy chain in response to the upstream clock output signal transmitted by the first battery module.

In one embodiment, the number of inserted clock pulses corresponds to a spacing in the daisy chain between the first battery module and the target module minus one, to compensate the clock difference caused by the daisy chain, such that the first battery module is able to synchronously receive the downstream data signal transmitted from the target module via the daisy chain in response to the upstream clock output signal.

In one embodiment, when the first battery module operates in the middle mode or the top mode and when the first battery module is determined as the target module, the battery control circuit is configured to operably receive an upstream data input signal from an upstream data input terminal and receive an upstream clock input signal from an upstream clock input terminal, and the battery control circuit is configured to operably generate a downstream data output signal at a downstream data output terminal according to the upstream data input signal; wherein the downstream data output signal is in synchronization with the upstream clock input signal, and wherein the upstream clock input signal includes the predetermined number of clock pulses.

In one embodiment, when the first battery module operates in the middle mode or the top mode and when the first battery module is determined as the target module, the downstream data output signal includes at least one of the following: (1) a downstream confirmation signal, which is configured to confirm that the target module has received the upstream data input signal; (2) read-out data of a target register of the target module; and/or (3) downstream data packet checking information corresponding to the read-out data.

In one embodiment, the battery control circuit further includes an upstream data input terminal, an upstream clock input terminal, an upstream data output terminal and a downstream data input terminal, wherein when the first battery module operates in the middle mode and when the first battery module is determined not to be the target module, the battery control circuit is configured to operably receive the upstream clock input signal from the upstream clock input terminal, to operably receive the upstream data input signal from the upstream data input terminal, and to operably receive a downstream data input signal from the downstream data input terminal, and the battery control circuit is configured to operably generate the upstream clock output signal at the upstream clock output terminal according to the upstream clock input signal, to operably generate an upstream data output signal at the upstream data output terminal according to the upstream data input signal, and to operably generate the downstream data output signal at the downstream data output terminal according to the downstream data input signal; wherein a number of clock pulses of the upstream clock output signal is less by one than a number of clock pulses of the upstream clock input signal.

In one embodiment, when the first battery module operates in the middle mode and when the first battery module is determined not to be the target module, the upstream clock output signal includes the predetermined number of clock pulses plus a number of inserted clock pulses, wherein the number of inserted clock pulses corresponds to a spacing in the daisy chain between the first battery module and the target module minus one.

In one embodiment, the battery control circuit further includes an upstream data output terminal and a downstream data input terminal, wherein when the first battery module operates in the bottom mode, the battery control circuit is configured to operably generate an upstream data output signal at the upstream data output terminal and receive a downstream data input signal at the downstream data input terminal, wherein the upstream data output signal includes at least one of the following: (1) the address information of the target module; (2) an address of a target register of the target module; (3) a read command; (4) a write-in command; (5) write-in data; (6) upstream data packet checking information corresponding to the write-in data; and/or (7) an upstream confirmation signal, which is configured to confirm that the first battery module has received the downstream data input signal.

In one embodiment, the communication interface protocol is inter-integrated circuit (I2C) bus protocol.

In one embodiment, the battery control circuit further includes a downstream fault input terminal and a downstream fault output terminal, wherein: when the battery control circuit detects an occurrence of a fault, the battery control circuit generates a downstream fault output signal at the downstream fault output terminal; or when the battery control circuit receives a downstream fault input signal at the downstream fault input terminal, the battery control circuit generates the downstream fault output signal at the downstream fault output terminal; wherein the battery system turns OFF a current connection path between the battery system and an external side of the battery system according to the downstream fault output signal.

In one embodiment, the second battery modules have a same configuration as the first battery module does.

From another perspective, the present invention provides a battery system comprising a plurality of battery modules, wherein the plurality of battery modules are connected to one another in daisy-chain configuration and communicates with one other through a daisy chain according to a communication interface protocol, wherein the communication interface protocol performs data communication via a data packet, wherein the data packet has a predetermined number of clock pulses for performing synchronous data communication, wherein the plurality of battery modules are arranged to include a bottom battery module operating in a bottom mode, a top battery module operating in a top mode and at least one middle battery module operating in a middle mode, wherein one of the plurality of battery modules is determined as a target module according to address information; each battery module including: a battery unit including at least one battery, wherein the battery unit outputs a battery unit voltage between a positive terminal and a negative terminal of the battery unit; and a battery control circuit, which is powered by the battery unit voltage, the battery control circuit being configured to operably detect the battery unit voltage of the battery unit and/or control the battery unit; wherein the battery units of the battery modules are connected in series, so that the battery system outputs a battery system voltage between a positive terminal and a negative terminal of the battery system; wherein each battery control circuit includes a plurality of terminals, wherein the plurality of terminals includes: an upstream clock input terminal, an upstream clock output terminal, an upstream data input terminal, an upstream data output terminal, a downstream data input terminal, and a downstream data output terminal, wherein the battery control circuits of the battery modules are connected to one another in daisy-chain configuration via the corresponding plurality of terminals; wherein the battery control circuit corresponding to the bottom battery module generates an upstream clock output signal complying with the communication interface protocol at the upstream clock output terminal, wherein the upstream clock output signal includes the predetermined number of clock pulses plus a number of inserted clock pulses, wherein the number of inserted clock pulses is greater than or equal to one, to compensate a clock difference caused by the daisy chain, such that the bottom battery module is able to synchronously receive a downstream data signal transmitted from the target module via the daisy chain in response to the upstream clock output signal transmitted by the bottom battery module.

From yet another perspective, the present invention provides a battery control circuit for use in a first battery module, wherein the first battery module is for use in a battery system, the first battery module being connected in daisy-chain configuration to other second battery modules in the battery system and the first battery module communicating with other second battery modules through a daisy chain according to a communication interface protocol, wherein the communication interface protocol performs data communication via a data packet, wherein the data packet has a predetermined number of clock pulses, wherein a target module is determined to be the first battery module or one of the second battery modules according to address information, wherein in the daisy chain, the first battery module operates in a bottom mode, a middle mode or a top mode; the first battery module including a battery unit including at least one battery, wherein the battery unit outputs a battery unit voltage between a positive terminal and a negative terminal of the battery unit; wherein battery control circuit is characterized in that: the battery control circuit is powered by the battery unit voltage, the battery control circuit being configured to operably detect the battery unit voltage of the battery unit and/or control the battery unit, wherein the battery control circuit includes an upstream clock output terminal; and when the first battery module operates in the bottom mode, the battery control circuit generates an upstream clock output signal corresponding to the communication interface protocol at the upstream clock output terminal, wherein the upstream clock output signal includes the predetermined number of clock pulses plus a number of inserted clock pulses, wherein the number of inserted clock pulses is greater than or equal to one, to compensate a clock difference caused by the daisy chain, such that the first battery module is able to synchronously receive a downstream data signal transmitted from the target module via the daisy chain in response to the upstream clock output signal transmitted by the first battery module.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 2:
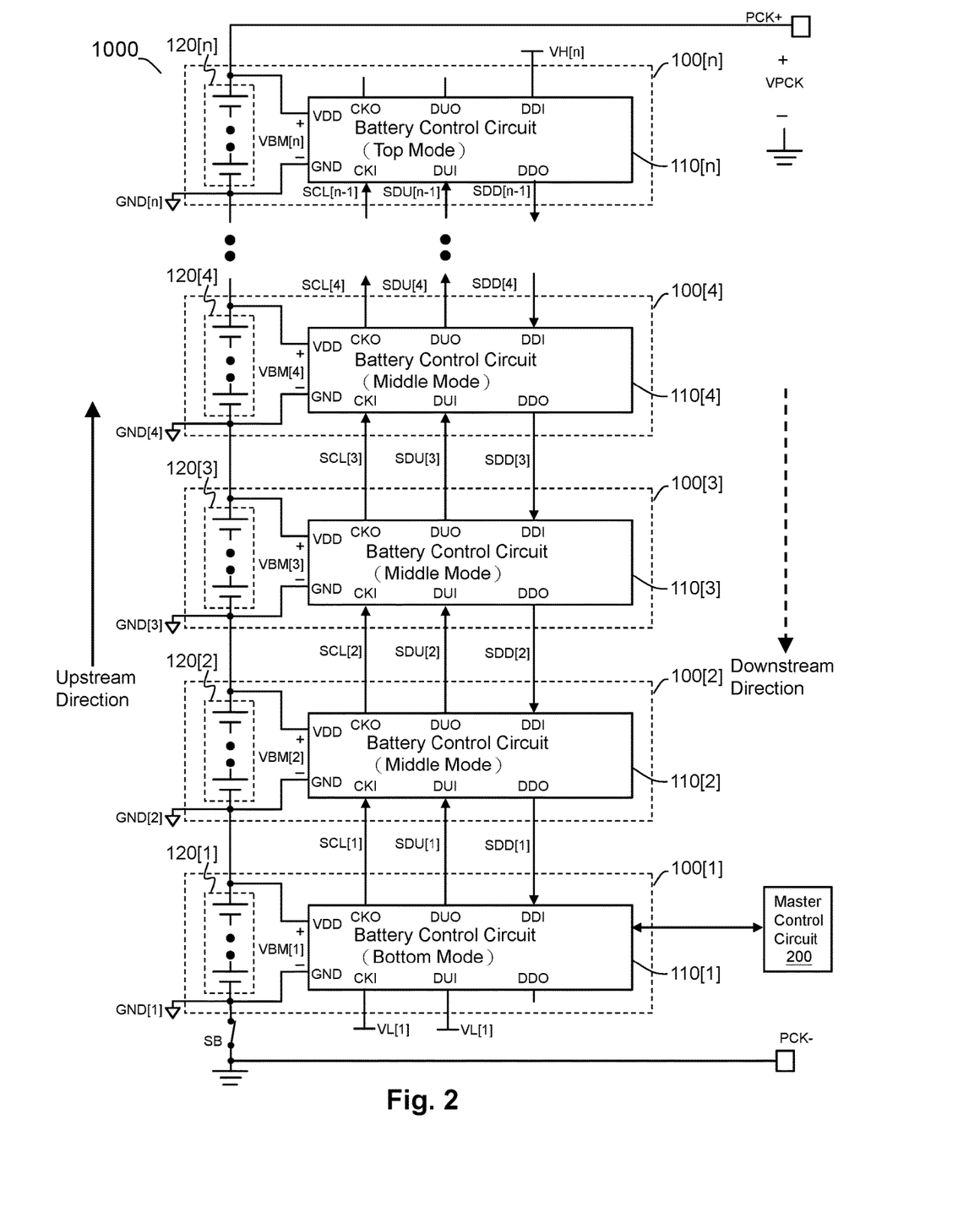
FIG. 2 shows a schematic diagram of a battery system according to an embodiment of the present invention.

Please refer to FIG. 2, which shows a schematic diagram of a battery system (i.e., battery system 1000) according to an embodiment of the present invention. As shown in FIG. 2, in one embodiment, the battery system 1000 includes battery modules 100[1]~100[n]. The battery modules 100[1]~100[n] are connected to one another in daisy-chain configuration and communicate with one another through the daisy chain according to a communication interface protocol. The communication interface protocol performs data communication by data packets wherein each data packet has a predetermined number of clock pulses for performing synchronous data communication. The battery modules 100[1]~100[n] are arranged in such a way to include a bottom battery module 100[1] operating in a bottom mode, a top battery module 100[n] operating in a top mode and at least one middle battery module 100[2]~100[n-1] operating in a middle mode (the middle battery module 100[n-1] is not shown but its existence is obvious).

Figure 3:
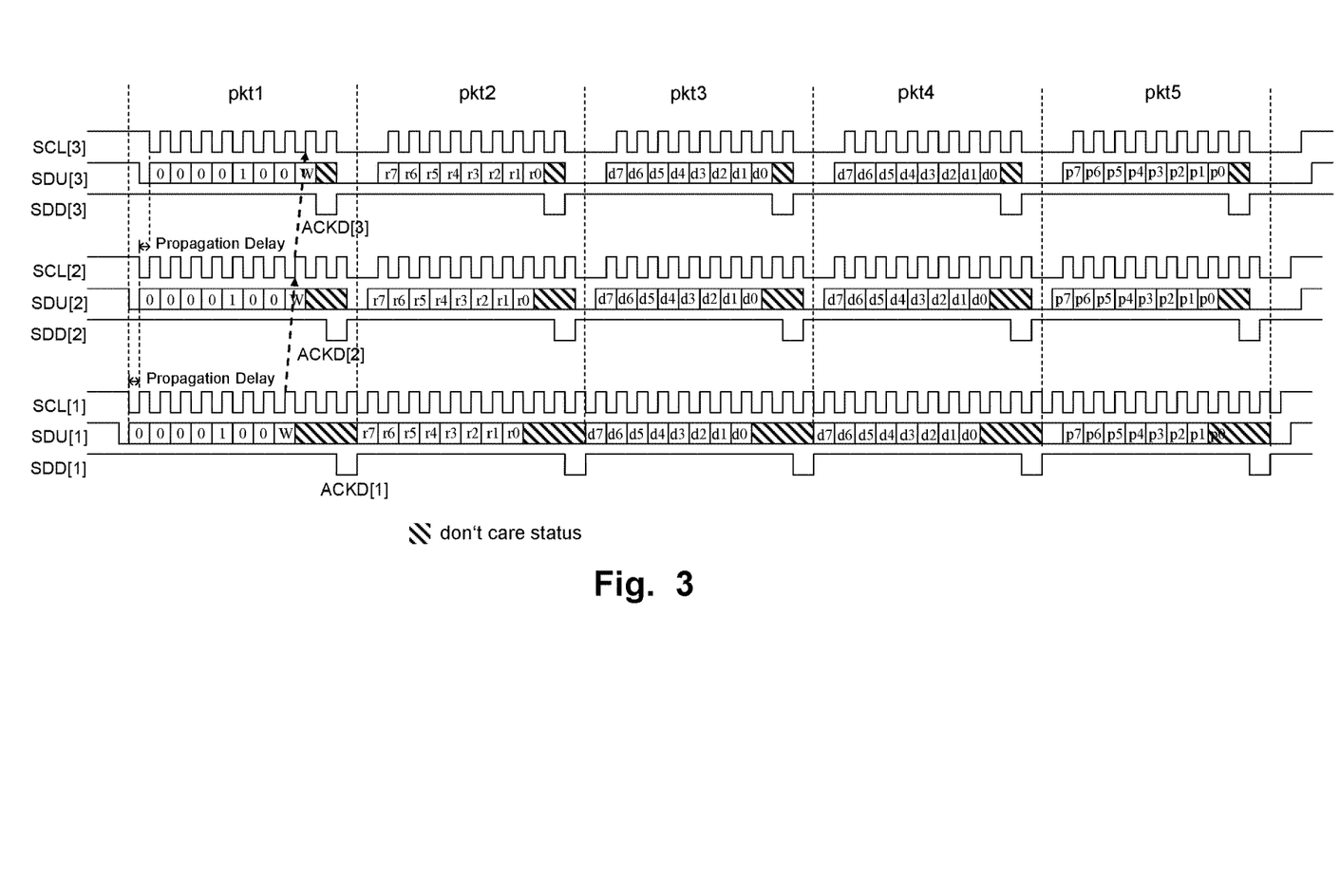
FIG. 3 shows waveforms corresponding to an embodiment of a battery system according to the present invention, demonstrating how the battery system performs data communication via daisy chain configuration.

In more detail, in one embodiment, the communication interface protocol can be, for example but not limited to, an inter-integrated circuit (I2C) bus (typically referred to as I2C) protocol. Please refer to FIG. 3 along with FIG. 2. FIG. 3 shows waveforms corresponding to an embodiment of a battery system according to the present invention, demonstrating how the battery system performs data communication via daisy chain configuration. As shown in FIG. 3, in this embodiment where I2C is employed, each data packet (e.g., as shown by the data packets pkt1~pkt5 in FIG. 3) can include, for example but not limited to, nine clock pulses (e.g., as shown by the upstream clock signals SCL[1]~SCL[3] in FIG. 3), so as to perform synchronous data communication. In this embodiment, the clock pulses include one clock pulse which is configured to trigger the synchronous transmission confirmation signal (ACK), which will be described in detail later.

Please still refer to FIG. 3 along with FIG. 2. When the battery modules 100[1]~100[n] communicate with one another via I2C, the battery modules 100[1]~100[n] will determine which one of the battery modules 100[1]~100[n] is a target module according to address information. For example, in the data packet pkt1 shown in FIG. 3, the first seven-bit data of an upstream data signal SDU[3] (e.g., as shown by "0000100" in FIG. 3) is the address information. In this embodiment, the address information "0000100" for example corresponds to the battery module 100[4]. In other words, in this embodiment, the bottom battery module 100[1] will communicate with or perform data exchange with the battery module 100[4] (more details will be described later).

Please still refer to FIG. 2. Each battery module (100[1]~100[n]) includes a corresponding battery unit (120[1]~120[n]) and a corresponding battery control circuit (110[1]~110[n]). In one embodiment, each battery unit (120[1]~120[n]) includes plural batteries which are connected to one another in series. Each battery unit 120[1]~120[n] outputs a corresponding battery unit voltage VBM[1]~VBM[n] between a corresponding positive terminal and a corresponding negative terminal of each battery unit 120[1]~120[n]. It is noteworthy that, in another embodiment, the battery unit can include just one battery.

The battery units 120[1]~120[n] of the battery module 100[1]~100[n] are connected in series, so that the battery system 1000 outputs a battery system voltage VPCK between a positive terminal PCK+ and a negative terminal PCK− of the battery system 1000.

From one perspective, the battery modules 100[1]~100[n] are the same in hardware aspect; however, the same hardware but different location causes the battery modules to operate in a bottom mode (e.g. corresponding to the bottom battery module 100[1]), a top mode (e.g. corresponding to the top battery module 100[n]) or a middle mode (e.g. corresponding to the middle battery modules 100[2]~100[n-1]).

Please still refer to FIG. 2. The battery control circuits 110[1]~110[n] are powered by the corresponding battery unit voltages VBM[1]~ VBM[n] through corresponding positive power terminal VDD and corresponding negative power terminal GND, and the battery control circuits 110[1]~110[n] detect the corresponding battery unit voltages and control the corresponding battery units 120[1]~120[n]. For example, the battery control circuits perform over voltage protection in charging operation or under voltage protection in discharging operation of the corresponding battery units. In the configuration that a battery unit includes plural batteries, the battery control circuits perform voltage balancing control on the batteries of the corresponding battery units. Besides, the battery control circuits provide a communication function among the battery modules which are coupled in daisy chain configuration.

In one specific embodiment, the battery control circuits $110[1] \sim 110[n]$ conduct voltage balancing control on the batteries of the battery units $120[1] \sim 120[n]$ individually, such that the batteries of the battery units $120[1] \sim 120[n]$ are in a voltage-balanced state, that is, such that the batteries of any battery unit (such as battery unit $120[1]$) are in a voltage-balanced state. The "voltage-balanced state" means that the voltages of the batteries of one battery unit, during charging or discharging operation, are controlled to be substantially equal. Further, in a specific embodiment, by maintaining the batteries within each of the battery units (such as battery unit $120[1]$) in a voltage-balanced state, the battery unit voltages $VBM[1] \sim VBM[n]$ of the plural battery units $120[1] \sim 120[n]$) are in a voltage-balanced state.

Please still refer to FIG. 2. Each battery control circuit $110[1] \sim 110[n]$ includes plural terminals. In one embodiment, the terminals include: an upstream clock input terminal CKI, an upstream clock output terminal CKO, an upstream data input terminal DUI, an upstream data output terminal DUO, a downstream data input terminal DDI, and a downstream data output terminal DDO. The battery control circuits $110[1] \sim 110[n]$ of the battery modules $100[1] \sim 100[n]$ are connected to one another in daisy-chain configuration via the corresponding terminals.

Please still refer to FIG. 2. In this embodiment, the battery control circuits $110[1] \sim 110[n]$ are connected to one another in daisy-chain configuration as the following: along an upstream direction (as shown by the solid arrow in FIG. 2), the upstream clock output terminal CKO of a battery control circuit (e.g., $110[1]$) is coupled to the upstream clock input terminal CKI of a battery control circuit (e.g., $110[2]$) which is adjacent to the previous battery control circuit $110[1]$ along the upstream direction. In addition, the upstream data output terminal DUO of the battery control circuit (e.g., $110[1]$) is coupled to the upstream data input terminal DUI of the battery control circuit (e.g., $110[2]$) which is adjacent to the previous battery control circuit $110[1]$ along the upstream direction. Besides, the downstream data input terminal DDI of the battery control circuit (e.g., $110[1]$) is coupled to the downstream data output terminal DDO of the previous battery control circuit (e.g., $110[2]$) which is adjacent to the battery control circuit $110[1]$ along the upstream direction.

Please still refer to FIG. 2. In this embodiment, the battery control circuits $110[1] \sim 110[n]$ respectively generate the corresponding upstream clock signals $SCL[1] \sim SCL[n-1]$, upstream data signals $SDU[1] \sim SDU[n-1]$, and downstream data signals $SDD[1] \sim SDD[n-1]$.

Generally speaking, in the present invention, a battery control circuit will generate a corresponding upstream clock output signal, a corresponding upstream data output signal and a corresponding downstream data output signal at its upstream clock output terminal CKO, upstream data output terminal DUO and downstream data output terminal DDO, respectively. Besides, this battery control circuit can receive a corresponding upstream clock input signal, a corresponding upstream data input signal and a corresponding downstream data input signal at its upstream clock input terminal CKI, upstream data input terminal DUI and downstream data input terminal DDI, respectively.

Please still refer to FIG. 2. Take the battery control circuit $110[2]$ as an example. The battery control circuit $110[2]$ can generate a corresponding upstream clock output signal (corresponding to the upstream clock signal $SCL[2]$), a corresponding upstream data output signal (corresponding to the upstream data signal $SDU[2]$) and a corresponding downstream data output signal (corresponding to the downstream data signal $SDD[1]$) at the upstream clock output terminal CKO, the upstream data output terminal DUO and the downstream data output terminal DDO of the battery control circuit $110[2]$, respectively. Besides, the battery control circuit $110[2]$ can receive a corresponding upstream clock input signal (corresponding to the upstream clock signal $SCL[1]$), a corresponding upstream data input signal (corresponding to the upstream data signal $SDU[1]$) and a corresponding downstream data input signal (corresponding to the downstream data signal $SDD[2]$) at the upstream clock input terminal CKI, the upstream data input terminal DUI and the downstream data input terminal DDI of the battery control circuit $110[2]$, respectively. The rest of the battery control circuits operating in middle mode transmit and receive signals in like manner.

On the other hand, in one embodiment, the upstream clock input terminal CKI and the upstream data input terminal DUI of the battery control circuit $110[1]$ of the bottom battery module $100[1]$ are coupled to a low level (e.g., as shown by a disable level $VL[1]$ in FIG. 2). In one embodiment, the downstream data input terminal DDI of the battery control circuit $110[n]$ of the top battery module $100[n]$ is coupled to a high level (e.g., as shown by an enable level $VH[n]$ in FIG. 2).

Please still refer to FIG. 3 along with FIG. 2. According to the present invention, in one embodiment, the battery control circuit $110[1]$ of the bottom battery module $100[1]$ can generate an upstream clock output signal (corresponding to the upstream clock signal $SCL[1]$) complying with the communication interface protocol (e.g, I2C) at the upstream clock output terminal CKO. The upstream clock output signal (corresponding to the upstream clock signal $SCL[1]$) includes a predetermined number of clock pulses plus a number of inserted clock pulses. The number of the inserted clock pulses is greater than or equal to one, to compensate a clock difference caused by the propagation delay of the daisy chain, such that the bottom battery module $100[1]$ is able to synchronously receive a downstream data signal transmitted from the target module via the daisy chain in response to the upstream clock output signal (corresponding to the upstream clock signal $SCL[1]$) transmitted by the bottom battery module $100[1]$.

In more detail, in a master-slave type serial communication protocol such as I2C, a master interface controller (such as the bottom battery module $100[1]$ in FIG. 2) generates the clock signal, while a slave interface controller (such as the middle battery module $100[4]$ in FIG. 2) performs confirmation, data write-in and data read-out operations according to the clock signal generated by the master interface controller. Nevertheless, under a situation where a master-slave type serial communication protocol (e.g., I2C) is applied to a battery system having a daisy chain configuration such as the present invention, when the slave interface controller performs confirmation, data write-in and data read-out operations according to the clock signal generated by the master interface controller and when the slave interface controller transmits information back to the master interface controller according to the serial order of the daisy chain, it will result in a clock difference caused by the propagation delay of the daisy chain. For example, referring FIG. 3, if the bottom battery module 100[1] simply generates a total of nine clock pulses (e.g., as shown by the first nine clock pulses of the data packet pkt1 in FIG. 3) which complies with I2C, when the clock pulses are transmitted to the middle battery module 100[4], although the middle battery module 100[4] can respond and generate a confirmation signal (ACKD[3]), such confirmation signal (ACKD[3]) will not be able to be transmitted to the bottom battery module 100[1] via the daisy chain along a downstream direction (as shown by the dashed arrow in FIG. 2).

To overcome the above-mentioned drawback, according to the present invention, in one embodiment, as shown by the data packet pkt1 in FIG. 3, when the battery control circuit 110[1] generates the upstream clock output signal (corresponding to the upstream clock signal SCL[1]) at the upstream clock output terminal CKO, a number of inserted clock pulses will be added. In other words, the upstream clock output signal (corresponding to the upstream clock signal SCL[1]) includes the predetermined number of clock pulses plus the number of inserted clock pulses, whereby a clock difference caused by the propagation delay of the daisy chain is compensated, such that the bottom battery module 100[1] is able to synchronously receive a downstream data signal transmitted from the target module via the daisy chain in response to the upstream clock output signal (corresponding to the upstream clock signal SCL[1]) transmitted by the bottom battery module 100[1].

The term "clock difference" refers to: for one battery module to transmit signals to another battery module along the downstream direction, it is required for this another battery module to additionally insert a certain number of clock pulses in its upstream clock output signal, so that the signals transmitted from that one battery module can be correctly transmitted to that another battery module via the daisy chain. In one embodiment, this number of inserted clock pulses is correlated with a spacing in the daisy chain between that one battery module and that another battery module.

In one embodiment, as shown in FIG. 3, the number of inserted clock pulses corresponds to a spacing in the daisy chain between the bottom battery module 100[1] operating in the bottom mode and the target module, minus one. For example, assuming that the target module is the battery module 100[4], then the spacing in the daisy chain between the bottom battery module 100[1] and the battery module 100[4] is equal to three (that is, 4−1=3). Under such circumstance, in this embodiment, the number of inserted clock pulses will be equal to two (that is, 3−1=2). More specifically, as shown in FIG. 3, in a data packet (e.g., the data packet pkt1), the upstream clock output signal (corresponding to the upstream clock signal SCL[1]) generated by the bottom battery module 100[1] has a total of eleven (i.e., 9+2=11) clock pulses, to compensate a clock difference caused by the propagation delay of the daisy chain, such that the bottom battery module 100[1] is able to synchronously receive a downstream data signal transmitted from the target module via the daisy chain in response to the upstream clock output signal (corresponding to the upstream clock signal SCL[1]) transmitted by the bottom battery module 100[1]. Because the number of inserted clock pulses is correlated with a spacing in the daisy chain between the bottom battery module 100[1] and the target module (e.g., the battery module 100[4]), under above-mentioned situation where the spacing is greater than or equal to two, it is necessary to insert the clock pulse(s). Accordingly, from one perspective according to the present invention, when two battery modules communicating with each other are not directly adjacent to each other and it is required to insert a clock pulse, the number of inserted clock pulses is greater than or equal to one).

It is noteworthy that, in the above-mentioned embodiment, because the master interface controller is the bottom battery module 100[1], the number of inserted clock pulses is calculated based upon the spacing in the daisy chain between the bottom battery module 100[1] and the target module. However, this is just an illustrative example; in another embodiment, when the master interface controller is not the bottom battery module 100[1], the number of inserted clock pulses should be computed based upon the spacing in the daisy chain between the battery module which is adopted as the master interface controller and the target module. In addition, it is noteworthy that, the bottom battery module 100[1] can be a physical level which generates/receives signals for another master interface controller, instead of a bottom battery module within the battery system 1000. For example, a master control circuit 200 as shown in FIG. 2 can be adopted as a master interface controller under the communication interface protocol (e.g., I2C). In this case, in one embodiment, the bottom battery module 100[1] can communicate with or perform data exchange with the master control circuit 200 via for example but not limited to an I2C or SPI communication port.

Please still refer to FIG. 3 along with FIG. 2. According to the present invention, in one embodiment, when an battery module operating in the middle mode or the top mode and is determined as the target module (e.g., the battery module 100[4]), the corresponding battery control circuit (e.g., the battery control circuit 110[4]) of the battery module receives an upstream data input signal (e.g., corresponding to the upstream data signal SDU[3]) from its upstream data input terminal DUI and receives an upstream clock input signal (e.g., corresponding to the upstream clock signal SCL[1]) from its upstream clock input terminal CKI. And, this battery control circuit (e.g., the battery control circuit 110[4]) generates a downstream data output signal (e.g., corresponding to the downstream data signal SDD[3]) at its data output terminal DDO according to the upstream data input signal (e.g., corresponding to the upstream data signal SDU[3]).

To be more specific, for example, referring to the data packet pkt1 shown in FIG. 3, in the first eight clock pulses of the upstream clock signal SCL[3], the battery control circuit 110[4] is triggered by the upstream clock signal SCL[3], to synchronously receive the upstream data signal SDU[3]. That is, as shown in FIG. 3, the upstream data signal SDU[3] of the data packet pkt1 comprises the address information "0000100". After the battery control circuit 110[4] decodes the address information "0000100" to know that the battery module 100[4] corresponding to the battery control circuit 110[4] is the target module, and after the battery control circuit 110[4] receives a write-in command (e.g., as shown by W comprised in the upstream data signal SDU[3] of the data packet pkt1 in FIG. 3), the battery control circuit 110[4] is triggered at the ninth clock pulse of the upstream clock signal SCL[3] and synchronously generates the downstream data signal SDD[3] at the corresponding downstream data output terminal DDO, which includes the downstream confirmation signal ACKD[3] shown in FIG. 3, to confirm that the target module (i.e., the battery module 100[4]) has received complete information comprised in the upstream data input signal (SDU[3]).

Note that, in one embodiment, the number of the clock pulses in a data packet (e.g., the data packet pkt1) received by the battery module 100[4] (which is the target module) is equal to the above-mentioned "predetermined number". For example, in this embodiment, the predetermined number is equal to nine. That is, in this embodiment, a total of nine clock pulses is received by the battery module 100[4] (which is the target module).

Figure 4:
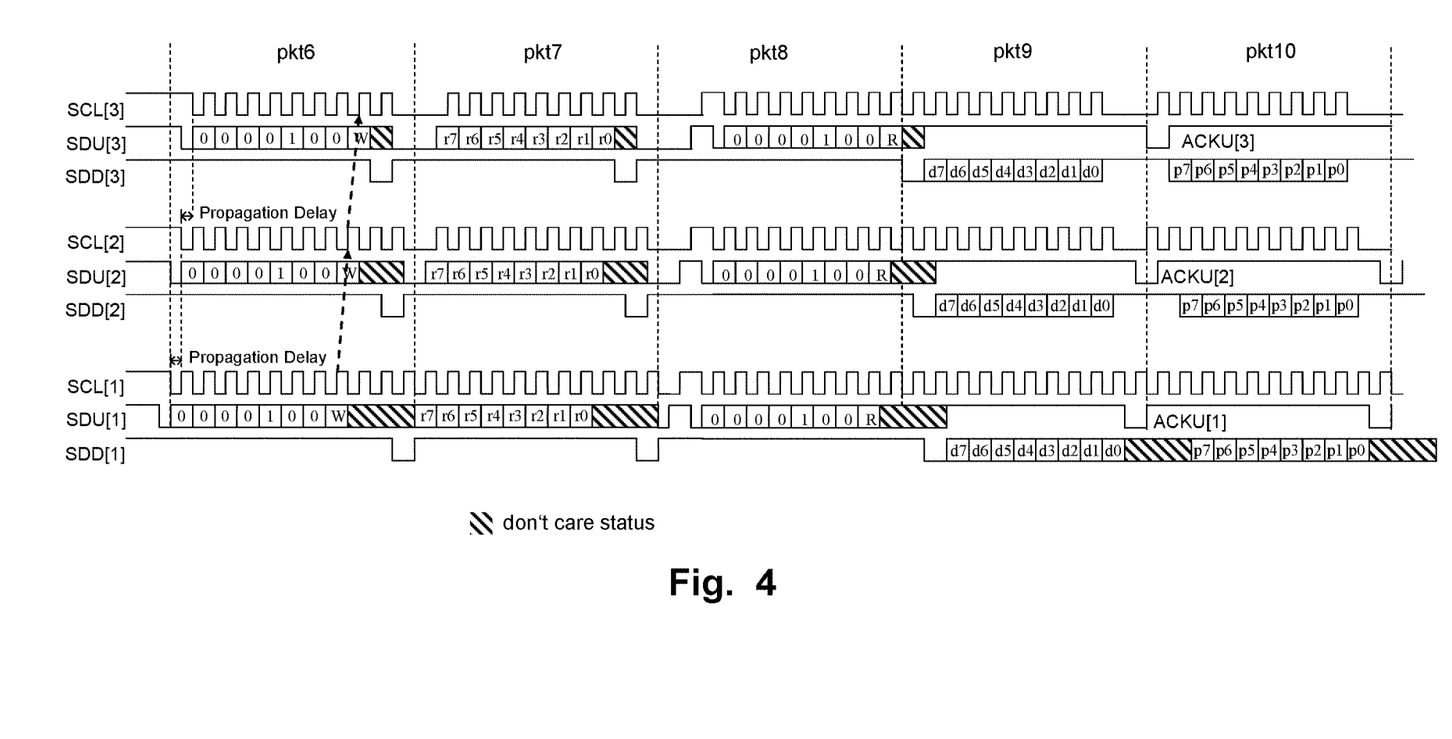
FIG. 4 shows waveforms corresponding to another embodiment of a battery system according to the present invention, demonstrating how the battery system performs data communication via daisy chain configuration.

Please refer to FIG. 3 in conjugation with FIG. 4. FIG. 4 waveforms corresponding to another embodiment of a battery system according to the present invention, demonstrating how the battery system performs data communication via daisy chain configuration. According to the present invention, when a battery module operating in the middle mode or the top mode is determined as the target module (e.g., the battery module 100[4]), the corresponding downstream data signal SDD[3] can include, in addition to the above-mentioned downstream confirmation signal ACKD [3], a read-out data from a target register of the target module; and/or a downstream data packet checking information corresponding to the read-out data.

In more detail, in one embodiment, as shown in FIG. 4, in the data packet pkt9 of the downstream data signal SDD[3] of the target module (e.g., the battery module 100[4]), one-byte read-out data (i.e., d7~d0 of the data packet pkt9 in FIG. 4) in the target register is sent. In the data packet pkt10 of the downstream data signal SDD[3] of the target module (e.g., the battery module 100[4]), downstream data packet checking information p7~p0 corresponding to the above-mentioned read-out data is sent. The downstream data packet checking information is configured to perform error correction coding (ECC), so that the receiver can check and correct errors in the data comprised in the data packet after the data packet is received by the receiver.

Please still refer to FIG. 2, FIG. 3 and FIG. 4. According to the present invention, when a battery module operating in the middle mode is determined not to be the target module (e.g., the battery module 100[2] in FIG. 2), the corresponding battery control circuit 110[2] of the battery module 100[2] receives the upstream clock input signal (corresponding to the upstream clock signal SCL[1]) from the upstream clock input terminal CKI, receives the upstream data input signal (corresponding to the upstream data signal SDU[1]) from the upstream data input terminal DUI, and receives the downstream data input signal (corresponding to the downstream data signal SDD[2]) from the downstream data input terminal DDI. And, the corresponding battery control circuit 110[2] of the battery module 100[2] generates the upstream clock output signal (corresponding to the upstream clock signal SCL[2]) at the corresponding upstream clock output terminal CKO according to the upstream clock input signal (corresponding to the upstream clock signal SCL[1]), generates the upstream data output signal (corresponding to the upstream data signal SDU[2]) at the corresponding upstream data output terminal DUO according to the upstream data input signal (corresponding to the upstream data signal SDU[1]), and generates the downstream data output signal (corresponding to the downstream data signal SDD[1]) at the corresponding downstream data output terminal DDO according to the downstream data input signal (corresponding to the downstream data signal SDD[2]). Note that, the above-mentioned upstream data signal SDU[2] is in synchronization with the upstream clock output signal (corresponding to the upstream clock signal SCL[2]), whereas, the above-mentioned downstream data signal SDD[1] is in synchronization with the upstream clock input signal (corresponding to the upstream clock signal SCL[1]).

Note that, as shown in FIG. 3 and FIG. 4, in this embodiment, in a data packet (e.g., the data packet pkt1), the number of clock pulses of an upstream clock output signal (e.g. the upstream clock signal SCL[2]) is less by one than the number of clock pulses of an upstream clock input signal (e.g. the upstream clock signal SCL[1]). To be more specific, in this embodiment, as described above, in a data packet (e.g., the data packet pkt1), the number of clock pulses of the upstream clock input signal SCL[1] is eleven, while, the number of clock pulses of the upstream clock output signal SCL[2] is ten.

For another example, the battery module 100[3] in FIG. 2 is also a battery module that operates in the middle mode and is determined not to be the target module, and the number of clock pulses of the corresponding upstream clock output signal (SCL[3]) is less by one than the number of clock pulses of the corresponding upstream clock input signal (SCL[2]). To be more specific, in this embodiment, as described above, in a data packet (e.g., the data packet pkt1), the number of clock pulses of the upstream clock input signal SCL[2] is ten, while the number of clock pulses of the upstream clock output signal SCL[3] is nine.

From one perspective, of each battery module which operates in the middle mode and is determined not to be the target module, the upstream clock output signal includes a predetermined number of clock pulses plus a number of inserted clock pulses. The number of inserted clock pulses corresponds to a spacing in the daisy chain between this battery module and the target module minus one. To be more specific, for example, a spacing in the daisy chain between the battery module 100[2] and the target module 100[4]) is equal to two. Accordingly, the corresponding upstream clock output signal of the battery module 100[2] includes a total of ten clock pulses (i.e., 9+2−1=10).

Please still refer to FIG. 3 and FIG. 4. In one embodiment, the battery control circuit 110[1] of the corresponding bottom battery module 100[1] (corresponding to the master interface controller) is configured to generate the upstream data output signal (corresponding to SDU[1]) at the upstream data output terminal DUO and receive the downstream data input signal (corresponding to SDD[1]) at the downstream data input terminal DDI, wherein the upstream data output signal (corresponding to SDU[1]) can include at least one of the following: (1) the address information of the target module (e.g., as shown by the address information "0000100" of the data packets pkt1, pkt6 and pkt8 in FIG. 3 and FIG. 4); (2) an address of a target register of the target module (e.g., as shown by the address byte r7~r0 of the data packets pkt2 and pkt7 in FIG. 3 and FIG. 4); (3) a read command (e.g., as shown by the bit "R" of the data packet pkt8 in FIG. 4); (4) a write-in command (e.g., as shown by the bit "W" of the data packets pkt1 and pkt6 in FIG. 3 and FIG. 4); (5) write-in data (e.g., as shown by the data byte d7~d0 of the data packets pkt3 and pkt4 in FIG. 3 and FIG. 4); (6) upstream data packet checking information corresponding to the write-in data (e.g., as shown by the upstream data packet checking byte p7~p0 of the data packet pkt5 in FIG. 3); and/or (7) an upstream confirmation signal ACKU (e.g., as shown by the upstream confirmation signal ACKU[1] of the data packet pkt10 in FIG. 4), which is for confirming that the bottom battery module 100[1] has received the downstream data input signal.

Please still refer to FIG. 2 in conjugation with FIG. 3 and FIG. 4. Note that, when a battery module operates in the middle mode and is determined not to be the target module (e.g., as shown by the battery module 100[2] in FIG. 2), as shown in FIG. 3 and FIG. 4, the battery module 100[2] replicates the data received in the data packets and transmits the data by data packets along the upstream direction or the downstream direction. For example, the battery module 100[2] replicates the upstream data signal SDU[1] (e.g., the write-in data byte d7~d0) in the data packets pkt3 and pkt4, and transmits the upstream data signal SDU[2] (e.g., the write-in data byte d7~d0) in synchronization with the upstream clock signal SCL[2]. For another example, the battery module 100[2] replicates the downstream data signal SDD[2] (e.g., the write-in data byte d7~d0) in the data packet pkt9, and transmits the downstream data signal SDD[1] (e.g., the write-in data byte d7~d0) in synchronization with the downstream clock signal SCL[1]. The other not-target battery modules operates likely as referring to the embodiments shown in FIG. 2, FIG. 3 and FIG. 4.

From one perspective, for each battery control circuit (e.g., the battery control circuits 110[2]~110[4]), the above-mentioned number of inserted clock pulses are provided during a transmission along the upstream direction, so that each battery control circuit can transmit the respective downstream data signal at its downstream data output terminal. From another perspective, take the data packet pkt1 as an example, for a battery control circuit having the inserted clock pulses (e.g., the battery control circuit 110[1]), after such battery control circuit having the inserted clock pulses has finished transmitting the upstream data signal SDU[1] (i.e., the first eight clock pulses), such battery control circuit must wait for a period of the number of inserted clock pulses (in the shown example, after waiting for a period of two clock pulses), and after that, at the next clock pulse (i.e., the 11$^{th}$ clock pulse), such battery control circuit will be allowed to synchronously retrieve the confirmation signal ACKD[1] of the downstream data signal SDD[1]. To be more specific, a clock difference of two clock pulses exists between the confirmation signal ACKD[3] and the confirmation signal ACKD[1]. More precisely, the time difference is equal to two clock pulses minus two units of propagation delays. For the other relationships in regard to the clock difference between different battery modules of a different spacing, those skilled in this art can derive by analogy.

Figure 5:
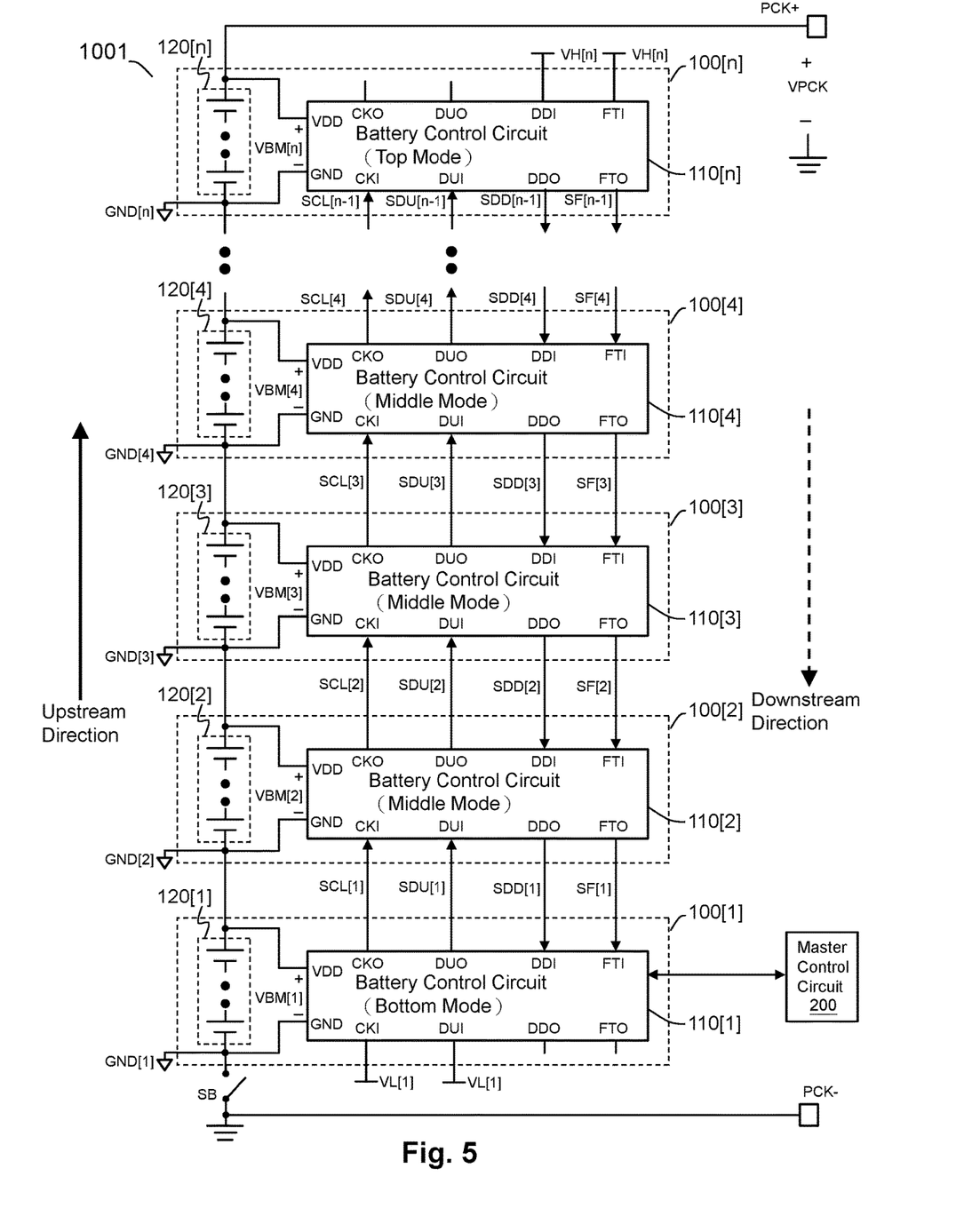
FIG. 5 shows a schematic diagram of a battery system according to another embodiment of the present invention.
Figure 6:
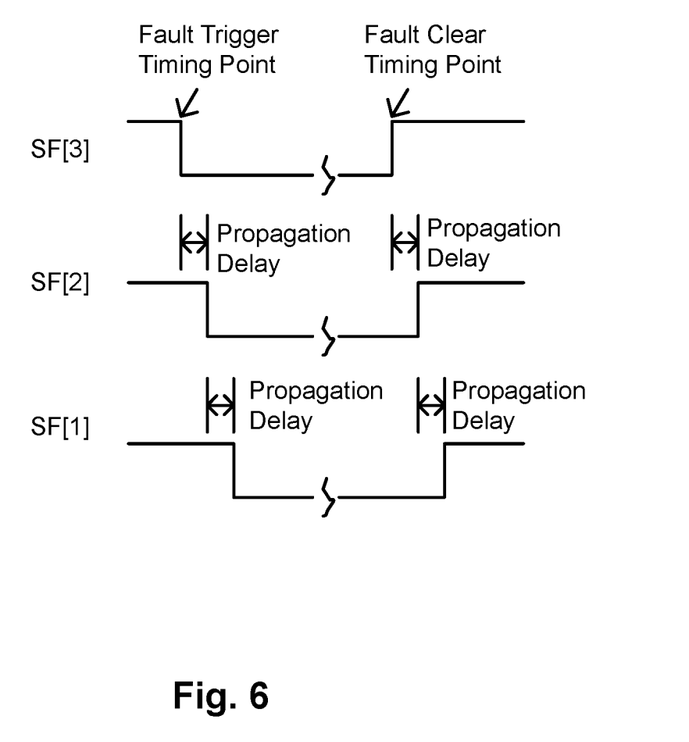
FIG. 6 shows operation waveforms corresponding to the battery system of FIG. 5.

Please refer to FIG. 5 and FIG. 6. FIG. 5 shows a schematic diagram of a battery system according to another embodiment of the present invention. FIG. 6 shows operation waveforms of the battery system of FIG. 5.

As shown in FIG. 5, in one embodiment, each battery control circuit 110[1]~110[n] of the battery system 1001 further includes a downstream fault input terminal FTI and a downstream fault output terminal FTO. In one embodiment, when a battery control circuit 110[1]~110[n] detects an occurrence of a fault (e.g., the above-mentioned overvoltage or under-voltage), the battery control circuit 110[1]~110[n] can generate a downstream fault output signal (e.g., as shown by the fault signals SF[1]~SF[n-1] in FIG. 5) at the downstream fault output terminal FTO. In another embodiment, the battery control circuit can transmit the fault signals sent from other battery control circuits via the daisy chain. For example, when the battery control circuit 110[2] receives a downstream fault input signal (e.g., as shown by the fault signal SF[2] in FIG. 5) sent from the battery control circuit (e.g., 110[3], which is adjacent to the battery control circuit 110[2] along the upstream direction) at the downstream fault input terminal FTI of the battery control circuit 110[2], the battery control circuit 110[2] will generate a downstream fault output signal (e.g., as shown by the fault signal SF[1] in FIG. 5) at the downstream fault output terminal FTO of the battery control circuit 110[2]. In one embodiment, the battery system 1001 turns OFF a current connection path between the battery system 1001 and an external side of the battery system 1001 according to the above-mentioned downstream fault output signal. In one embodiment, the current connection path between the battery system 1001 and an external side of the battery system 1001 can be turned OFF through turning OFF a bottom switch SB.

Please refer to FIG. 6. Note that, in one embodiment, when the above-mentioned fault signals SF[1]~SF[n-1] are transmitted along the downstream direction via the daisy chain, it is not necessary for the fault signals SF[1]~SF[n-1] to be synchronized with the above-mentioned clock pulses. In other words, the fault signals SF[1]~SF[n-1] can be asynchronously transmitted along the downstream direction via the daisy chain. Because the asynchronous transmission only involves the propagation delay caused by the battery control circuits, the fault condition can be more rapidly transmitted to, for example, the master control circuit 200, so that the above-mentioned protection can be imminently performed. Note that the above-mentioned asynchronous transmission can be applied to transmitting other signals in addition to the fault signals, as long as these other signals are not required to be in synchronization with the clock pulses. This embodiment demonstrates that, according to the present invention, under daisy chain configuration, synchronous and asynchronous communication can both be achieved, with proper interface protocols.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described herein before to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A first battery module for use in a battery system to be coupled to second battery modules which are different from the first battery module in the battery system in a daisy-chain configuration, wherein the first battery module communicates with the second battery modules through a daisy chain according to a communication interface protocol, wherein the communication interface protocol performs a data communication via a data packet, wherein the data packet has a predetermined number of clock pulses for performing a synchronous data communication, wherein a target module is determined to be the first battery module or one of the second battery modules according to address information, wherein in the daisy chain, the first battery module operates in a bottom mode, a middle mode or a top mode; the first battery module comprising:
- a battery unit including at least one battery, wherein the battery unit outputs a battery unit voltage between a positive terminal and a negative terminal of the battery unit; and
- a battery control circuit, which is powered by the battery unit voltage, the battery control circuit being configured to operably detect the battery unit voltage of the battery unit and/or control the battery unit, wherein the battery control circuit includes an upstream clock output terminal;
- wherein when the first battery module operates in the bottom mode, the battery control circuit generates an upstream clock output signal complying with the communication interface protocol at the upstream clock output terminal, wherein the upstream clock output signal includes the predetermined number of clock pulses plus a number of inserted clock pulses, wherein the number of inserted clock pulses is greater than or equal to one, to compensate a clock difference caused by the daisy chain, such that the first battery module is able to synchronously receive a downstream data signal transmitted from the target module via the daisy chain in response to the upstream clock output signal transmitted by the first battery module.

2. The first battery module of claim 1, wherein the number of inserted clock pulses corresponds to a spacing in the daisy chain between the first battery module and the target module minus one, to compensate the clock difference caused by the daisy chain, such that the first battery module is able to synchronously receive the downstream data signal transmitted from the target module via the daisy chain in response to the upstream clock output signal.

3. The first battery module of claim 1, wherein the battery control circuit further includes an upstream data input terminal, an upstream clock input terminal, and a downstream data output terminal, wherein when the first battery module operates in the middle mode or the top mode and when the first battery module is determined as the target module, the battery control circuit is configured to operably receive an upstream data input signal from the upstream data input terminal and receive an upstream clock input signal from the upstream clock input terminal, and the battery control circuit is configured to operably generate a downstream data output signal at the downstream data output terminal according to the upstream data input signal;
wherein the downstream data output signal is in synchronization with the upstream clock input signal, and wherein the upstream clock input signal includes the predetermined number of clock pulses.

4. The first battery module of claim 3, wherein when the first battery module operates in the middle mode or the top mode and when the first battery module is determined as the target module, the downstream data output signal includes at least one of the following:
(1) a downstream confirmation signal, which is configured to confirm that the target module has received the upstream data input signal;
(2) read-out data of a target register of the target module; and/or
(3) downstream data packet checking information corresponding to the read-out data.

5. The first battery module of claim 1, wherein the battery control circuit further includes an upstream data input terminal, an upstream clock input terminal, an upstream data output terminal and a downstream data input terminal, wherein when the first battery module operates in the middle mode and when the first battery module is determined not to be the target module, the battery control circuit is configured to operably receive an upstream clock input signal from the upstream clock input terminal, to operably receive an upstream data input signal from the upstream data input terminal, and to operably receive a downstream data input signal from the downstream data input terminal, and the battery control circuit is configured to operably generate the upstream clock output signal at the upstream clock output terminal according to the upstream clock input signal, to operably generate an upstream data output signal at the upstream data output terminal according to the upstream data input signal, and to operably generate a downstream data output signal at the downstream data output terminal according to the downstream data input signal;
wherein a number of clock pulses of the upstream clock output signal is less by one than a number of clock pulses of the upstream clock input signal.

6. The first battery module of claim 5, wherein when the first battery module operates in the middle mode and when the first battery module is determined not to be the target module, the upstream clock output signal includes the predetermined number of clock pulses plus a number of inserted clock pulses, wherein the number of inserted clock pulses corresponds to a spacing in the daisy chain between the first battery module and the target module minus one.

7. The first battery module of claim 1, wherein the battery control circuit further includes an upstream data output terminal and a downstream data input terminal, wherein when the first battery module operates in the bottom mode, the battery control circuit is configured to operably generate an upstream data output signal at the upstream data output terminal and receive a downstream data input signal at the downstream data input terminal, wherein the upstream data output signal includes at least one of the following:
(1) the address information of the target module;
(2) an address of a target register of the target module;
(3) a read command;
(4) a write-in command;
(5) write-in data;
(6) upstream data packet checking information corresponding to the write-in data; and/or
(7) an upstream confirmation signal, which is configured to confirm that the first battery module has received the downstream data input signal.

8. The first battery module of claim 1, wherein the communication interface protocol is inter-integrated circuit (I2C) bus protocol.

9. The first battery module of claim 1, wherein the battery control circuit further includes a downstream fault input terminal and a downstream fault output terminal, wherein:
when the battery control circuit detects an occurrence of a fault, the battery control circuit generates a downstream fault output signal at the downstream fault output terminal; or
when the battery control circuit receives a downstream fault input signal at the downstream fault input terminal, the battery control circuit generates the downstream fault output signal at the downstream fault output terminal;
wherein the battery system turns OFF a current connection path between the battery system and an external side of the battery system according to the downstream fault output signal.

10. The first battery module of claim 1, wherein the second battery modules have a same configuration as the first battery module does.

11. A battery system comprising a plurality of battery modules, wherein the plurality of battery modules are connected to one another in a daisy-chain configuration and communicates with one other through a daisy chain according to a communication interface protocol, wherein the communication interface protocol performs a data communication via a data packet, wherein the data packet has a predetermined number of clock pulses for performing a synchronous data communication, wherein the plurality of battery modules are arranged to include a bottom battery module operating in a bottom mode, a top battery module operating in a top mode and at least one middle battery module operating in a middle mode, wherein one battery module of the plurality of battery modules is determined as a target module according to address information; each battery module of the plurality of battery modules including:
- a battery unit including at least one battery, wherein the battery unit outputs a battery unit voltage between a positive terminal and a negative terminal of the battery unit; and
- a battery control circuit, which is powered by the battery unit voltage, the battery control circuit being configured to operably detect the battery unit voltage of the battery unit and/or control the battery unit;

wherein the battery units of the plurality of battery modules are connected in series, so that the battery system outputs a battery system voltage between a positive terminal and a negative terminal of the battery system;

wherein each battery control circuit includes a plurality of terminals, wherein the plurality of terminals includes: an upstream clock input terminal, an upstream clock output terminal, an upstream data input terminal, an upstream data output terminal, a downstream data input terminal, and a downstream data output terminal, wherein the battery control circuits of the plurality of battery modules are connected to one another in a daisy-chain configuration via corresponding terminals of the plurality of terminals;

wherein the battery control circuit corresponding to the bottom battery module generates an upstream clock output signal complying with the communication interface protocol at the upstream clock output terminal, wherein the upstream clock output signal includes the predetermined number of clock pulses plus a number of inserted clock pulses, wherein the number of inserted clock pulses is greater than or equal to one, to compensate a clock difference caused by the daisy chain, such that the bottom battery module is able to synchronously receive a downstream data signal transmitted from the target module via the daisy chain in response to the upstream clock output signal transmitted by the bottom battery module.

12. The battery system of claim 11, wherein the number of inserted clock pulses corresponds to a spacing in the daisy chain between the bottom battery module and the target module minus one, to compensate the clock difference caused by the daisy chain, such that the bottom battery module is able to synchronously receive the downstream data signal transmitted from the target module via the daisy chain in response to the upstream clock output signal.

13. The battery system of claim 11, wherein the battery control circuit corresponding to the battery module which operates in the middle mode or the top mode and is determined as the target module, is configured to operably receive an upstream data input signal from a corresponding upstream data input terminal and receive an upstream clock input signal from a corresponding upstream clock input terminal, and the battery control circuit is configured to operably generate a downstream data output signal at a corresponding downstream data output terminal according to the upstream data input signal;
- wherein the downstream data output signal is in synchronization with the upstream clock input signal, and wherein the upstream clock input signal includes the predetermined number of clock pulses.

14. The battery system of claim 13, wherein when the battery module operates in the middle mode or the top mode and is determined as the target module, a corresponding downstream data output signal of this battery module includes at least one of the following:
(1) a downstream confirmation signal, which is configured to confirm that the target module has received the upstream data input signal;
(2) read-out data of a target register of the target module; and/or
(3) downstream data packet checking information corresponding to the read-out data.

15. The battery system of claim 13, wherein the battery control circuit corresponding to the battery module which operates in the middle mode and is determined not to be the target module, is configured to operably receive the upstream clock input signal from a corresponding upstream clock input terminal, to operably receive the upstream data input signal from the corresponding upstream data input terminal, and to operably receive a downstream data input signal from a corresponding downstream data input terminal, and the battery control circuit is configured to operably generate the upstream clock output signal at a corresponding upstream clock output terminal according to the upstream clock input signal, to operably generate an upstream data output signal at a corresponding upstream data output terminal according to the upstream data input signal, and to operably generate the downstream data output signal at a corresponding downstream data output terminal according to the downstream data input signal;
- wherein a number of clock pulses of the upstream clock output signal is less by one than a number of clock pulses of the upstream clock input signal.

16. The battery system of claim 15, wherein when the battery module operates in the middle mode and is determined not to be the target module, a corresponding upstream clock output signal of this battery module includes the predetermined number of clock pulses plus a number of inserted clock pulses, wherein the number of inserted clock pulses corresponds to a spacing in the daisy chain between this battery module and the target module minus one.

17. The battery system of claim 11, wherein the battery control circuit corresponding to the bottom battery module is configured to operably generate an upstream data output signal at the upstream data output terminal and receive a downstream data input signal at the downstream data input terminal, wherein the upstream data output signal includes at least one of the following:
(1) the address information of the target module;
(2) an address of a target register of the target module;
(3) a read command;
(4) a write-in command;
(5) write-in data;
(6) upstream data packet checking information corresponding to the write-in data; and/or (7) an upstream confirmation signal, which is configured to confirm that the bottom battery module has received the downstream data input signal.

18. The battery system of claim 11, wherein the communication interface protocol is inter-integrated circuit (I2C) bus protocol.

19. The battery system of claim 11, wherein the each battery control circuit further includes a downstream fault input terminal and a downstream fault output terminal, wherein:
when the battery control circuit detects an occurrence of a fault, the battery control circuit generates a downstream fault output signal at the downstream fault output terminal; or
when the battery control circuit receives a downstream fault input signal at the downstream fault input terminal, the battery control circuit generates the downstream fault output signal at the downstream fault output terminal;
wherein the battery system turns OFF a current connection path between the battery system and an external side of the battery system according to the downstream fault output signal.

20. The battery system of claim 11, wherein each battery unit of each corresponding battery module of the plurality of battery modules includes a plurality of batteries which are connected to one another in series, wherein each battery control circuit performs a voltage balancing operation on each battery of the plurality of batteries of a corresponding battery unit, so that the voltages of the plurality of batteries of the corresponding battery unit are balanced.

21. The battery system of claim 11, wherein each battery unit of each corresponding battery module includes a plurality of batteries which are connected to one another in series, wherein each battery control circuit performs a voltage balancing operation on each battery of the plurality of batteries of a corresponding battery unit, so that the plurality of batteries of each battery unit are in a voltage-balanced state and the battery units of the plurality of the battery modules are in a voltage-balanced state.

22. A battery control circuit for use in a first battery module, wherein the first battery module is for use in a battery system, the first battery module being connected in a daisy-chain configuration to second battery modules which are different from the first battery module in the battery system and the first battery module communicating with the second battery modules through a daisy chain according to a communication interface protocol, wherein the communication interface protocol performs a data communication via a data packet, wherein the data packet has a predetermined number of clock pulses, wherein a target module is determined to be the first battery module or one of the second battery modules according to address information, wherein in the daisy chain, the first battery module operates in a bottom mode, a middle mode or a top mode; the first battery module including a battery unit including at least one battery, wherein the battery unit outputs a battery unit voltage between a positive terminal and a negative terminal of the battery unit; wherein battery control circuit is characterized in that:
the battery control circuit is powered by the battery unit voltage, the battery control circuit being configured to operably detect the battery unit voltage of the battery unit and/or control the battery unit, wherein the battery control circuit includes an upstream clock output terminal; and when the first battery module operates in the bottom mode, the battery control circuit generates an upstream clock output signal corresponding to the communication interface protocol at the upstream clock output terminal, wherein the upstream clock output signal includes the predetermined number of clock pulses plus a number of inserted clock pulses, wherein the number of inserted clock pulses is greater than or equal to one, to compensate a clock difference caused by the daisy chain, such that the first battery module is able to synchronously receive a downstream data signal transmitted from the target module via the daisy chain in response to the upstream clock output signal transmitted by the first battery module.

23. The battery control circuit of claim 22, wherein the number of inserted clock pulses corresponds to a spacing in the daisy chain between the first battery module and the target module minus one, to compensate the clock difference caused by the daisy chain, such that the first battery module is able to synchronously receive the downstream data signal transmitted from the target module via the daisy chain in response to the upstream clock output signal.

24. The battery control circuit of claim 22, wherein the battery control circuit further includes an upstream data input terminal, an upstream clock input terminal, and a downstream data output terminal, wherein when the first battery module operates in the middle mode or the top mode and when the first battery module is determined as the target module, the battery control circuit is configured to operably receive an upstream data input signal from the upstream data input terminal and receive an upstream clock input signal from the upstream clock input terminal, and the battery control circuit is configured to operably generate a downstream data output signal at the downstream data output terminal according to the upstream data input signal;
wherein the downstream data output signal is in synchronization with the upstream clock input signal, and wherein the upstream clock input signal includes the predetermined number of clock pulses.

25. The battery control circuit of claim 24, when the first battery module operates in the middle mode or the top mode and when the first battery module is determined as the target module, the downstream data output signal includes at least one of the following:
(1) a downstream confirmation signal, which is configured to confirm that the target module has received the upstream data input signal;
(2) read-out data of a target register of the target module; and/or
(3) downstream data packet checking information corresponding to the read-out data.

26. The battery control circuit of claim 22, wherein the battery control circuit further includes an upstream data input terminal, an upstream clock input terminal, an upstream data output terminal and a downstream data input terminal, wherein when the first battery module operates in the middle mode and when the first battery module is determined not to be the target module, the battery control circuit is configured to operably receive an upstream clock input signal from the upstream clock input terminal, to operably receive an upstream data input signal from the upstream data input terminal, and to operably receive a downstream data input signal from the downstream data input terminal, and the battery control circuit is configured to operably generate the upstream clock output signal at a corresponding upstream clock output terminal according to the upstream clock input signal, to operably generate an upstream data output signal at a corresponding upstream data output terminal according to the upstream data input signal, and to operably generate the downstream data output signal at a corresponding downstream data output terminal according to the downstream data input signal;

wherein a number of clock pulses of the upstream clock output signal is less by one than a number of clock pulses of the upstream clock input signal.

27. The battery control circuit of claim 26, wherein when the first battery module operates in the middle mode and when the first battery module is determined not to be the target module, the upstream clock output signal includes the predetermined number of clock pulses plus a number of inserted clock pulses, wherein the number of inserted clock pulses corresponds to a spacing in the daisy chain between the first battery module and the target module minus one.

28. The battery control circuit of claim 22, further including an upstream data output terminal and a downstream data input terminal, wherein when the first battery module operates in the bottom mode, the battery control circuit is configured to operably generate an upstream data output signal at the upstream data output terminal and receive a downstream data input signal at the downstream data input terminal, wherein the upstream data output signal includes at least one of the following:

(1) the address information of the target module;
(2) an address of a target register of the target module;
(3) a read command;
(4) a write-in command;
(5) write-in data;
(6) upstream data packet checking information corresponding to the write-in data; and/or
(7) an upstream confirmation signal, which is configured to confirm that the first battery module has received the downstream data input signal.

29. The battery control circuit of claim 22, further including a downstream fault input terminal and a downstream fault output terminal, wherein:

when the battery control circuit detects an occurrence of a fault, the battery control circuit generates a downstream fault output signal at the downstream fault output terminal; or when the battery control circuit receives a downstream fault input signal at the downstream fault input terminal, the battery control circuit generates the downstream fault output signal at the downstream fault output terminal;

wherein the battery system turns OFF a current connection path between the battery system and an external side of the battery system according to the downstream fault output signal.

* * * * *